(12) United States Patent
Vaynblat et al.

(10) Patent No.: US 9,430,531 B2
(45) Date of Patent: *Aug. 30, 2016

(54) DELIVERING PERSONALIZED CONTENT BASED ON A SOCIAL GRAPH OF SHARING ACTIVITY OF USERS OF THE OPEN WEB

(71) Applicant: RadiumOne, Inc., San Francisco, CA (US)

(72) Inventors: Dimitri Vaynblat, San Carlos, CA (US); Gurbaksh Chahal, San Francisco, CA (US)

(73) Assignee: RadiumOne, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/805,241

(22) Filed: Jul. 21, 2015

(65) Prior Publication Data

US 2015/0326681 A1     Nov. 12, 2015

Related U.S. Application Data

(63) Continuation of application No. 14/523,818, filed on Oct. 24, 2014, now Pat. No. 9,098,872, which is a
(Continued)

(51) Int. Cl.
*G06F 15/16*     (2006.01)
*G06F 17/30*     (2006.01)
(Continued)

(52) U.S. Cl.
CPC ....... *G06F 17/30528* (2013.01); *G06F 3/0481* (2013.01); *G06F 3/04842* (2013.01);
(Continued)

(58) Field of Classification Search
CPC ....... H04L 41/12; H04L 51/32; H04L 67/22; H04L 43/06; H04L 67/2823; H04L 51/046; H04L 12/1813; H04L 51/04; H04L 67/02; H04L 67/16; H04L 67/42; H04L 51/36; G06Q 30/0255; G06Q 50/01; G06Q 30/0641; G06Q 30/0275; G06Q 30/0269; G06Q 30/0277; G06Q 30/0271; G06Q 30/0261; G06Q 30/0241; G06Q 30/0201; G06F 17/30864; G06F 17/30705; G06F 17/30958; G06F 3/04842; G06F 3/0481; G06F 17/30528; G06F 17/30554; G06F 17/30345; G06F 17/30876; G06F 17/30598; H04N 7/147; H04W 4/12
USPC .................................................. 709/223–224
See application file for complete search history.

(56) References Cited

U.S. PATENT DOCUMENTS 7,761,549 B2 *   7/2010   Farnham ............... G06F 3/0481
                                                                                                        709/204
8,228,821 B2     7/2012   Robinson et al.
(Continued)

OTHER PUBLICATIONS

Narayanan et al., Privacy and Security, Myths and Fallacies of "Personally Identifiable Information" 24 Communications of the ACM (Jun. 2010).*
(Continued)

*Primary Examiner* — Lance L Barry
(74) *Attorney, Agent, or Firm* — Aka Chan LLP

(57) ABSTRACT

A social graph is built which includes interactions, sharing activity, and connections between the users of the open Web and can be used to improve ad targeting and content personalization. Personally identifiable information is not collected. Sharing activity between two users will affect ads or content that both users will be presented while surfing the Web. This sharing activity includes sending of links, sending of videos, sending of files, cutting and pasting of content, sending text messages, and sending of e-mails. Building of the social graph can include creating an edge in the social graph that is representative of a particular category type. Based on the social graph, personalized digital content can be selected.

109 Claims, 9 Drawing Sheets

Related U.S. Application Data continuation of application No. 14/286,768, filed on May 23, 2014, now Pat. No. 8,892,734, which is a continuation of application No. 13/526,288, filed on Jun. 18, 2012, now Pat. No. 8,751,621.

(60) Provisional application No. 61/497,814, filed on Jun. 16, 2011.

(51) Int. Cl.

| | |
|---|---|
| *H04L 29/08* | (2006.01) |
| *H04L 12/24* | (2006.01) |
| *H04L 12/58* | (2006.01) |
| *H04L 12/26* | (2006.01) |
| *G06Q 30/02* | (2012.01) |
| *G06Q 50/00* | (2012.01) |
| *G06F 3/0484* | (2013.01) |
| *G06Q 30/06* | (2012.01) |
| *G06F 3/0481* | (2013.01) |
| *H04L 12/18* | (2006.01) |
| *H04N 7/14* | (2006.01) |
| *H04W 4/12* | (2009.01) |
| *H04L 29/06* | (2006.01) |

(52) U.S. Cl.
CPC ... *G06F17/30345* (2013.01); *G06F 17/30539* (2013.01); *G06F 17/30554* (2013.01); *G06F 17/30598* (2013.01); *G06F 17/30705* (2013.01); *G06F 17/30864* (2013.01); *G06F 17/30876* (2013.01); *G06F 17/30958* (2013.01); *G06Q 30/0201* (2013.01); *G06Q 30/0241* (2013.01); *G06Q 30/0255* (2013.01); *G06Q 30/0261* (2013.01); *G06Q 30/0269* (2013.01); *G06Q 30/0271* (2013.01); *G06Q 30/0273* (2013.01); *G06Q 30/0275* (2013.01); *G06Q 30/0277* (2013.01); *G06Q 30/0641* (2013.01); *G06Q 50/01* (2013.01); *H04L 12/1813* (2013.01); *H04L 41/12* (2013.01); *H04L 43/06* (2013.01); *H04L 51/04* (2013.01); *H04L 51/046* (2013.01); *H04L 51/32* (2013.01); *H04L 51/36* (2013.01); *H04L 67/02* (2013.01); *H04L 67/16* (2013.01); *H04L 67/22* (2013.01); *H04L 67/2823* (2013.01); *H04L 67/42* (2013.01); *H04N 7/147* (2013.01); *H04W 4/12* (2013.01)

(56) References Cited

U.S. PATENT DOCUMENTS

| | | | |
|---|---|---|---|
| 8,400,944 | B2 | 3/2013 | Robinson et al. |
| 8,572,129 | B1* | 10/2013 | Lee ................ G06F 17/30861 707/798 |
| 8,751,621 | B2 | 6/2014 | Vaynblat et al. |
| 2006/0122974 | A1 | 6/2006 | Perisic |
| 2007/0112730 | A1* | 5/2007 | Gulli ................ G06F 17/30864 |
| 2008/0222613 | A1* | 9/2008 | Allen ................ G06F 17/30038 717/128 |
| 2009/0182589 | A1 | 7/2009 | Kendall et al. |
| 2009/0198562 | A1 | 8/2009 | Wiesinger et al. |
| 2009/0327296 | A1* | 12/2009 | Francis ................ G06F 17/30 |
| 2010/0042944 | A1* | 2/2010 | Robinson ............... G06Q 10/10 715/771 |
| 2010/0293052 | A1* | 11/2010 | DiOrio ................ G06Q 30/00 705/14.53 |
| 2010/0318925 | A1 | 12/2010 | Sethi et al. |
| 2011/0004692 | A1* | 1/2011 | Occhino ................ H04L 67/16 709/228 |
| 2011/0035503 | A1* | 2/2011 | Zaid ................ H04L 63/0407 709/228 |
| 2011/0093506 | A1 | 4/2011 | Lunt et al. |
| 2011/0184792 | A1* | 7/2011 | Butcher ................ G06Q 10/10 705/14.13 |
| 2011/0208822 | A1* | 8/2011 | Rathod ................ G06Q 30/02 709/206 |
| 2011/0258064 | A1* | 10/2011 | Agarwal ................ G06Q 30/02 705/26.1 |
| 2011/0276396 | A1* | 11/2011 | Rathod ............. G06F 17/30867 705/14.49 |
| 2012/0109732 | A1* | 5/2012 | Jaffe ................ G06Q 30/0224 705/14.25 |
| 2012/0225720 | A1* | 9/2012 | Baszucki ................ H04L 67/02 463/42 |
| 2012/0324027 | A1 | 12/2012 | Vaynblat |
| 2013/0290427 | A1* | 10/2013 | Proud ................ H01F 38/14 709/204 |
| 2014/0129349 | A1 | 5/2014 | Vaynblat et al. |
| 2014/0129660 | A1 | 5/2014 | Vaynblat et al. |
| 2014/0257982 | A1 | 9/2014 | Vaynblat et al. |

OTHER PUBLICATIONS

PCT International Search Report, PCT/US2012/043014, Feb. 18, 2013.

Wortham, Jenna, "Goo.gl Challenges Bit.ly as King of the Short," NYTimes.com, Dec. 14, 2009, 2 pages, retrievable from http://bits.blogs.nytimes.com/2009/12/14/googl-challenges-bitly-as-king-of-the-short/?_r=0.

Supplemental European Search Report, EP 12 79 9810, Feb. 20, 2015, 6 pages.

\* cited by examiner

DELIVERING PERSONALIZED CONTENT BASED ON A SOCIAL GRAPH OF SHARING ACTIVITY OF USERS OF THE OPEN WEB

CROSS-REFERENCE TO RELATED APPLICATIONS

This patent application is a continuation of U.S. patent application Ser. No. 14/523,818, filed Oct. 24, 2014, issued as U.S. Pat. No. 9,098,872 on Aug. 4, 2015, which is a continuation of U.S. patent application Ser. No. 14/286,768, filed May 23, 2014, issued as U.S. Pat. No. 8,892,734 on Nov. 18, 2014, which is a continuation of U.S. patent application Ser. No. 13/526,288, filed Jun. 18, 2012, issued as U.S. Pat. No. 8,751,621 on Jun. 10, 2014, which claims the benefit of U.S. patent application 61/497,814, filed Jun. 16, 2011. These applications are incorporated by reference along with all other references cited in this application.

BACKGROUND OF THE INVENTION

This invention relates to online networks, and more specifically to building a social graph for a network. The social graph includes connections or interactions between individuals of the network and can be used to target content and advertisements to individuals better.

The Internet is a global system of interconnected computer networks. People are spending more of their time on the Internet. Via computers and smartphones, people are surfing the Web, sending e-mail, watching videos, reading news, making appointments, shopping, and much more. The Internet and Web has taken market share from many other communications media including the telephone, television, radio, magazines, and newspapers. Consequently, content providers and advertisers want to learn more about the activities and habits of online users in order to better target content, including advertisements.

The activities and connections, including sharing activity, of Internet users of are important to determine how content for users should be personalized. Social networking sites, such as Facebook, LinkedIn, and Twitter are membership communities. To become a member, the social network site collects information about its members, which may include information such as name, phone number, e-mail address, and often much more. After becoming a member, the member can add connections to other members, such as their friends specified, for example, by name or e-mail address. In these communities, the connections static and form a static social network. Within these communities, the activities of its members can be tracked.

Despite the success of static social networking sites, the size of the Internet and Web (which can be referred to as the "open Web") is significantly larger. Activities of Web users and how these users interact with other users are also important information from which to determine how to personalize content, services, and advertisements. However, unlike a static social network, users in the open Web are anonymous and do not specify their "friends." Further, in the open Web, due to privacy concerns, any information gathered should not include any personally identified information. It is a very difficult task to obtain a social graph of users of the open Web.

Therefore, there is a need for a technique of building a social graph of users of the open Web, including tracking of the sharing activity of users. This will improve ad targeting and content personalization according to user connection models based on sharing activity among users for online, mobile, and IPTV media.

BRIEF SUMMARY OF THE INVENTION

A social graph is built which includes interactions, sharing activity, and connections between the users of the open Web and can be used to improve ad targeting and content personalization. Sharing activity between two users will affect ads or content that both users will be presented while surfing the Web. This sharing activity includes sending of links, sending of videos, sending of files, cutting and pasting of content, sending text messages, and sending of e-mails. Building of the social graph can include creating an edge in the social graph that is representative of a particular category type. Based on the social graph, personalized digital content can be selected.

A specific implementation of a technique of building a social graph for the open Web is a product, ShareGraph™, by RadiumOne. ShareGraph is a trademark of RadiumOne. The RadiumOne Web site, www.radiumone.com, Share-Graph, RadiumOne publications (including user guides, tutorials, videos, and others), and other publications about ShareGraph are incorporated by reference. Compared to a walled social network such as Facebook, ShareGraph is made up of who users share content with on the open Web, and it represents a more accurate description of who our true connections are.

A social graph of the open Web identifies the real, dynamic connections between users. Content providers and advertisers will be able to locate more easily consumers who matter, which can lead to improved results in selling services or products.

Although people may list 250 or more people in social network (e.g., Facebook) as friends, typically the true circle of close personal connections actually much smaller. The fact is a social network can be a bit like a giant address book, a way of keeping our contacts up-to-date. But the truly close—and for marketers, valuable—connections occur among people who are actively sharing their lives with each other.

Sharing is an important indicator of interest in a particular subject or topic, activity, person. The entire Web has become social, allowing us to share content and experiences across the open Web with the people who matter most to you. Close personal connections are not simply about "checking in" on social networks. Instead, true connections happen when people share experiences, passions, and opinions on sites that really mean something to them.

A system tracks and evaluates the sharing that takes place among consumers who demonstrate these close social connections. A particular implementation is by RadiumOne, and is called ShareGraph™.

In an implementation, various sharing activities happening throughout the open Web—sharing through sharing buttons, copying content into e-mail, and others—are captured and contributed to building user ShareGraph. Share-Graph models user connections with other users, where connections are characterized by strength of connection (based on type, recency, frequency, and directionality of sharing) as well as category of connection (based on type and category of content being shared—e.g., information on cheap flights to New York would contribute to a category travel to New York).

Each user is identified through unique but anonymous user ID (e.g., RadiumOne user identifier (R1 UID)). The RadiumOne user ID is stored in a RadiumOne cookie as well as in RadiumOne Operating Storage of User Models. When RadiumOne cookie is not available, the RadiumOne user ID is evaluated using device fingerprinting algorithms.

User predictive models and ShareGraph are kept up-to-date inside the RadiumOne Operating Storage of User Models.

As new data for a particular user is available, user models and ShareGraph are updated inside RadiumOne Operating Storage of User Models.

Also, user models are being aged according to proprietary algorithms as time passes.

In an implementation, the system uses the ShareGraph to serve extremely relevant ads to consumers. The more often strong connections interact on the open Web, the more ShareGraph can point us to ads they might want to see and potentially share.

When consumers share content outside of Facebook, they are always doing it with people they have a lot in common with. In many ways, Facebook essentially represents a giant address book in the cloud. It is on the rest of the Web that people can show their true graph of connections by whom they are sharing content with and who they are really influenced by.

ShareGraph looks at information that consumers share with their real connections and then uses these insights to serve the most relevant ads possible. Unlike a social graph of Facebook (where users are "connected" to people whom they may not know well), the most significant insights into consumers can be obtained by understanding what people share with a much smaller circle of friends.

There are at least four major areas of differentiation between ShareGraph and others social graphs that allow the system to significantly reduce noise in modeling of users and user connections and, thus, provide much more precise targeting of advertisement to users than the companies using social graphs.

ShareGraph algorithms are supported by highly scalable underlying technology that aggregates and normalizes data from a variety of sources, models distinct connections between users, and then targets the most relevant ads in real time.

ShareGraph uses no personally identifiable information (PII) of any kind.

An edge between two nodes in a share-graph—a connection between two users—represents both context (category) and strength. In fact, for two users, there could be several edges each representing a different category, and each having its own strength. Defined in such way, a share-graph is technically speaking a weighted multi-graph. To assess strength of a connection between two users related to a category, we collect all available interactions between these users—with context that belongs to the category—and apply our algorithms. The algorithms take into consideration types of interactions, their frequency, recency, directionality, and so forth.

An example of an interaction would be sharing an article or link through e-mail. The content of an article will allow us to map this interaction to one or several categories. Then we update the connection between these two users in this category (these categories) with this new interaction.

(1) ShareGraph™ represents real, actionable connections, connections where users sent or share content or information with each other. This naturally happens within a much tighter, most relevant circle. This is unlike vague, static connections of social graphs resulting in a large group of people—most of whom having very little in common.

(2) ShareGraph™ leverages all user activities throughout the entire Internet, as opposed to social graphs that are limited to walled garden of specific social networks.

(3) A ShareGraph™ edge has interest/commercial intent associated with the connection. This is derived from the type of content or information being shared. This is unlike social graph static edges devoid of any interest or intent.

(4) A ShareGraph™ edge has relative strength of interest/intent associated with the connection. We score strength of a connection between two users based on type of sharing done between these users, frequency of sharing events, recency, etc. This is unlike social graph static edges not differentiated by the strength of connections.

In an implementation, a method includes: receiving first activity information for a sender of a first link to at least one recipient collected by a collection resource at a Web site, where no personally identifiable information of the sender is collected in the first activity information; storing the first activity information at a storage server; receiving second activity information when a recipient accesses the first link sent by the sender corresponding to the first activity information stored at the storage server, where no personally identifiable information of the recipient is collected in the second activity information; using at least one processor, attempting to identify a first node representative of the sender in a social graph; and when a first node representative of the sender in a social graph is not found and after the receiving second activity, creating a second node to represent the sender in the social graph.

The method can further include: attempting to identify a third node representative of the recipient in a social graph; when a third node representative of the recipient in a social graph is not found, creating a fourth node to represent the recipient in the social graph; determining a category for the first link as a first category type; and in the social graph, creating a first edge between the second and fourth nodes, where the first edge is assigned the first category type and a first weighting for the first category type.

The method can include: receiving third activity information for the sender of a second link the recipient collected by a collection resource at a Web site; and receiving fourth activity information when the recipient accesses the second link sent by the sender corresponding to the third activity information stored at the storage server.

The method can include: determining a category for the second link is the first category type; and in the social graph, increasing a value of the first weighting for the first edge between the second and fourth nodes. The method can include: determining a category for the second link is the second category type, different from the first category type; and in the social graph, creating a second edge between the second and fourth nodes, where the second edge is assigned the second category type and a second weighting associated with the second category type.

The method can include: in the social graph, reducing a value of the first weighting when a time for the fourth activity information is more recent than a time for the second activity information. The method can include: based on the social graph including the second and fourth nodes, making a bid to an ad exchange for an ad associated with at least one of the second node or fourth node.

The collection resource at a Web site that is used to collect first activity information can be sharing widget. The collection resource at a Web site that is used to collect first activity information can be a URL shortening. The collection resource at a Web site that is used to collect first activity information can include an instant messenger application.

Attempting to identify a first node representative of the sender in a social graph can include: extracting a user identifier from a cookie received with the first activity data; and if a match for the user identifier is not found in the social graph, performing a probabilistic fingerprinting approach using attributes including at least one of device identifiers; IP addresses; operating systems; browsers types; browser versions; or user navigational, geo-temporal, and behavioral patterns.

In an implementation, a method includes: collecting activity data from Web sources using collection devices, where the activity data does not contain any personally identifiable information; identifying users and sharing activity between the users in the activity data; using at least one processor, forming a social graph of the users and sharing activity, where users are represented as nodes in the social graph and sharing activity are represented as edges in the social graph; and using the social graph including sharing activity, selecting an online advertisement for delivery to a user in the social graph.

The collection devices can include URL shortening. The collection devices can include an instant messaging application. Each edge between nodes in the social graph can represent a different sharing category.

The identifying users and sharing activity between the users in the activity data can include: extracting a user identifier from a cookie in the activity data; and identifying a first node in the social graph based on the user identifier. A value of an edge connected to the first node can be updated.

In an implementation, a method includes: collecting activity data from Web sources using collection devices; based the activity data, forming a social graph having a first node and first-degree nodes connected to the first node, where each first-degree node is connected to second-degree nodes; determining edges between first-degree and second-degree nodes include a first category type; determining no edges exist between the first node and the first-degree nodes of the first category type; and based on the edges of the first category type between first-degree and second-degree nodes, using at least one processor, making an inference that the first node has an interest associated with the first category type.

The collection devices can include URL shortening. The collection devices can include instant messaging.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
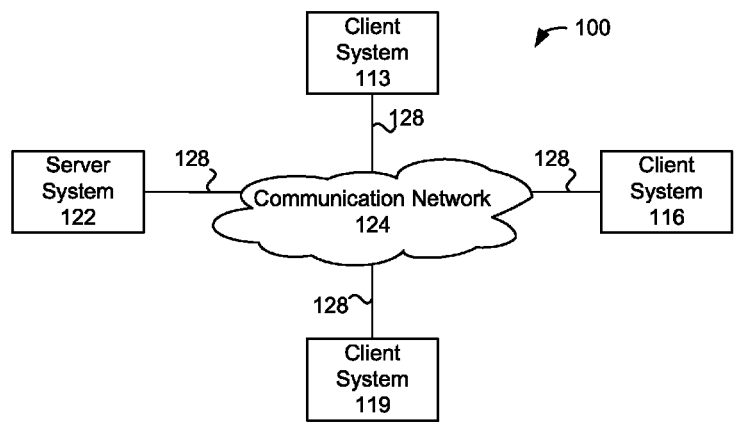
FIG. 1 shows a simplified block diagram of a client-server system and network in which an embodiment of the invention may be implemented.

FIG. 1 is a simplified block diagram of a distributed computer network 100 which embodiment of the present invention can be applied. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser program provided by Microsoft Corporation, and the Firefox browser provided by Mozilla, and others.

Figure 2:
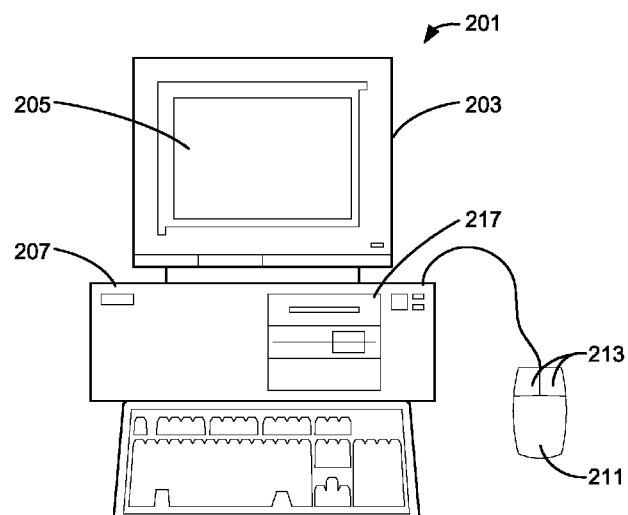
FIG. 2 shows a more detailed diagram of an exemplary client or server computer which may be used in an implementation of the invention.

FIG. 2 shows an exemplary computer system (e.g., client or server) of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
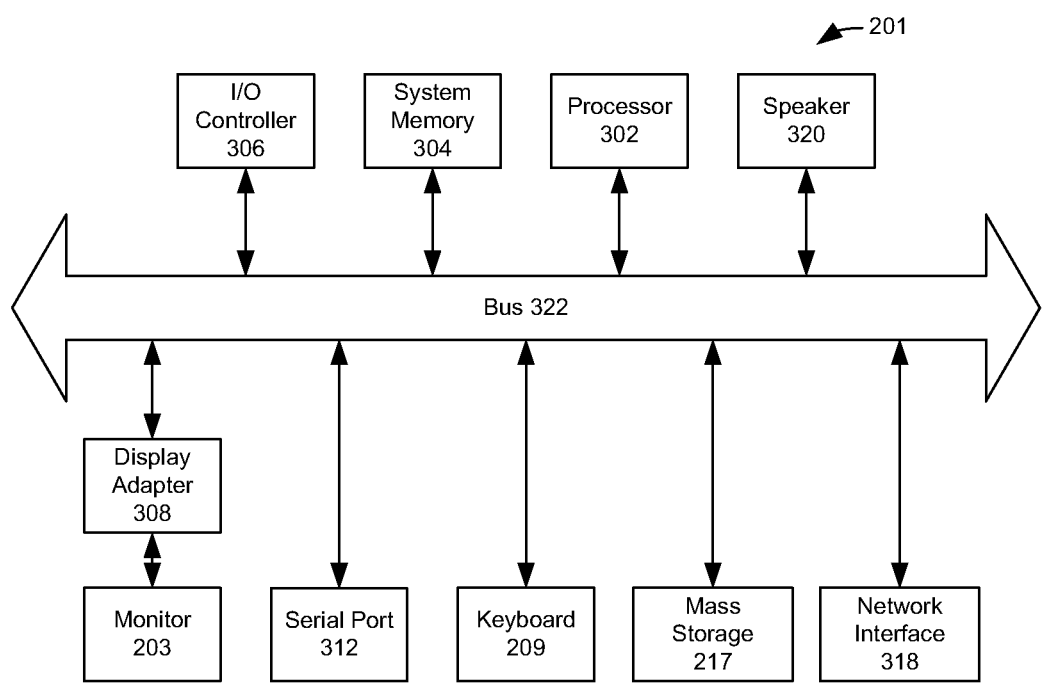
FIG. 3 shows a system block diagram of a client or server computer system used to execute application programs such as a web browser or tools for building a social graph according to the invention.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www-.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows 8, Windows CE, Windows Mobile), Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples), near field communication (NFC), radio-frequency identification (RFID), mobile or cellular wireless (e.g., 2G, 3G, 4G, 3GPP LTE, WiMAX, LTE, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

Figure 4A:
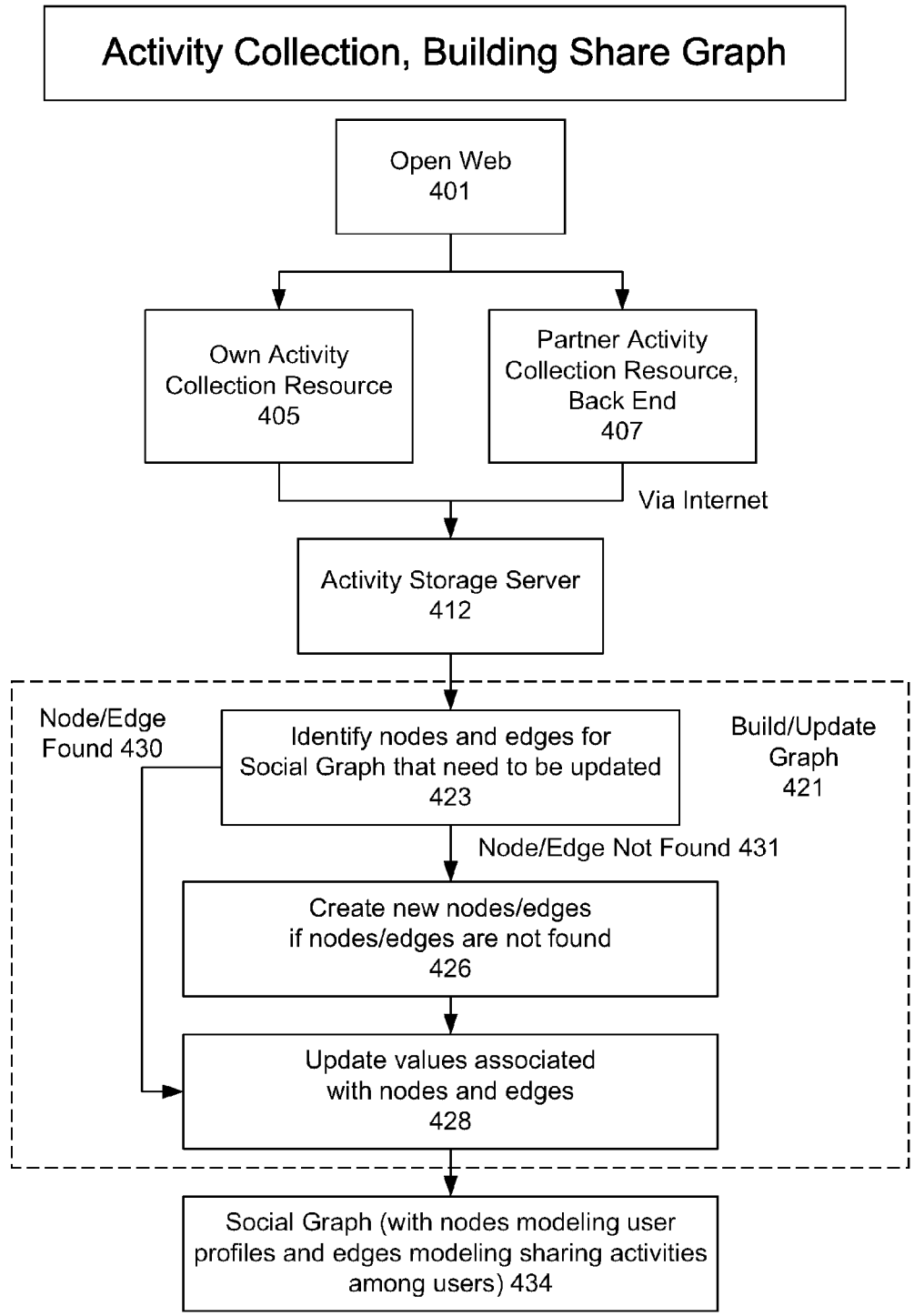
FIG. 4A shows a system for activity collection and building a social graph including sharing activity between users.

FIG. 4A shows a system for activity collection and building a social graph (e.g., ShareGraph™) for a network of users. The system monitors users of the Internet or Web as they surf the Web (e.g., reading news, searching for information, shopping, and so forth). This monitoring occurs without regard to whether the users are logged into a membership site (e.g., Facebook, pay sites, and others), which may be referred to as the open Web 401.

Figure 4B:
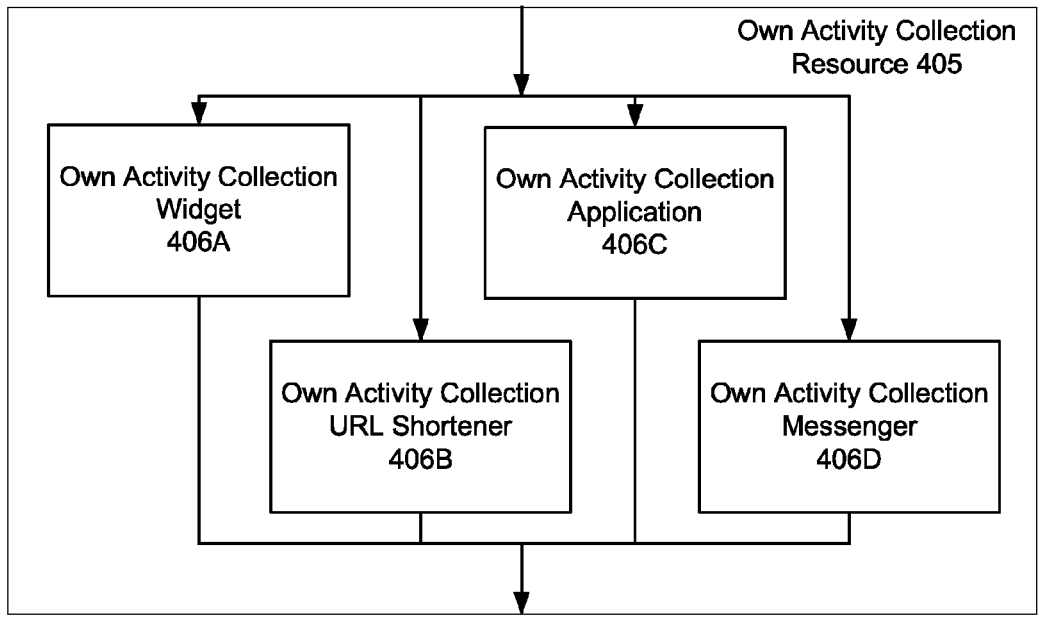
FIG. 4B shows some examples of system-owned collection resources.
Figure 4C:
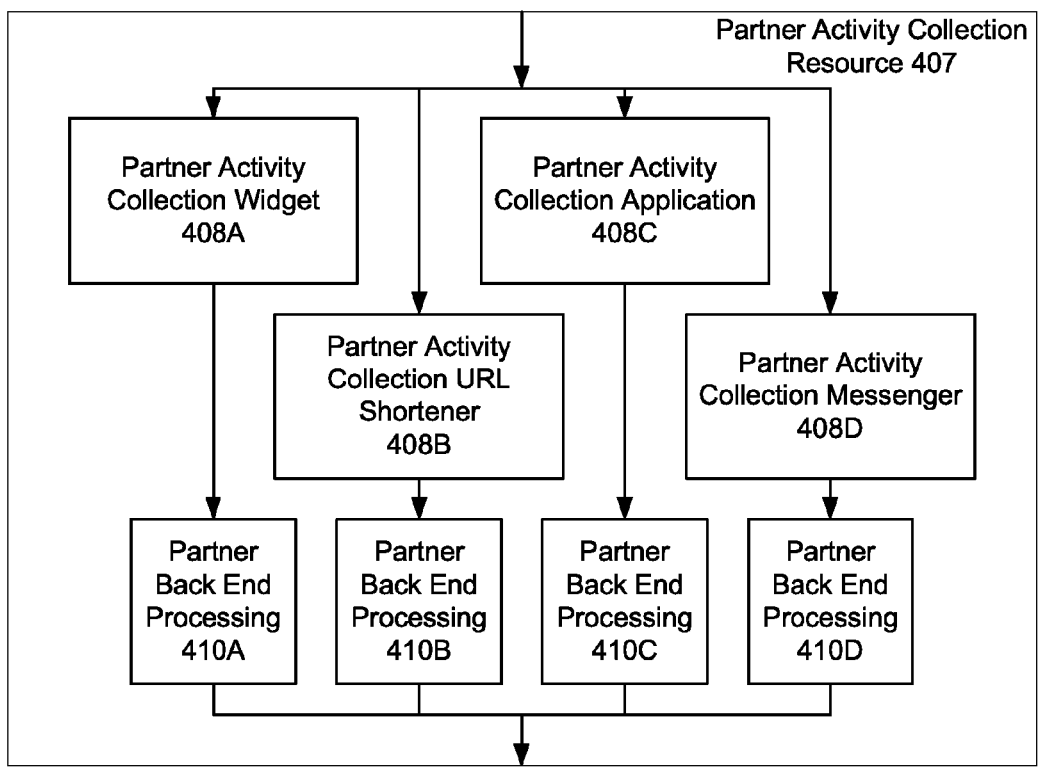
FIG. 4C shows some examples of partner-owned collection resources.

Monitoring occurs at open Web sites by using a system-owned collection resource 405 or a partner-owned collection resource 407, or both. FIG. 4B shows some examples of system-owned collection resources. FIG. 4C shows some examples of partner-owned collection resources.

The collection resources or collection devices include (1) activity collection widgets, either system owned 406A or partner 408A, or both; (2) URL shorteners, either system owned 406B or partner 408B, or both (both UI or API, or both); (3) applications or sites where users post and share content, either system owned 406C or partner 408C, or both, (e.g., text, images, audio, or video, or any combination of these); and (4) communication applications, either system owned 406D or partner 408D, or both (e.g., instant messenger, text chat, voice chat, video chat, or others).

Resources 405 and 407 will gather activity data and pass this data to an activity storage server 412, typically via the Internet. Partner resource 407 may be processed by a partner back end, and then this data is passed to activity storage server 412.

For example, referring to FIG. 4C, partner activity collect widget 408A is passed to partner back end processing 410A. Partner URL shortener 408B is passed to partner back end processing 410B. Partner activity collection application 408C is passed to partner back end processing 410C. Partner activity collection messenger 408D is passed to partner back end processing 410D. From the back end processing blocks 410A, 410B, 410C, and 410D, data is passed to activity storage server 412.

Collection widget. In an implementation, a collection widget is written in JavaScript code. A widget can also be written in other languages. This widget is added at various Web sites to gather activity data about users' interactions at that site. When a user visits a particular Web site with the widget, the widget executes via a Web browser of the visiting user. The user may not be aware that the widget is collecting activity data. However, in an implementation, the activity data gathered does not include any personally identifiable information.

Widget 406A is usually controlled or operated by the same entity that is running activity server 412. Typically, widget 406A is added to or presented at a third party site. The widget owner may pay the third party site operator for adding the widget to the third party's Web site.

A user at third party site can use the widget to share something on the site. For example, the user can share an article or link with their friends, such as posting on their Facebook or other social networking page, posting on their Twitter or other microblogging site, e-mail to others, send via a messenger program, or other sharing activity. Widget 406A will gather this activity data and pass this data to an activity storage server 412, typically via the Internet.

Partner widget 408A is operated by an entity different from the entity running activity server 412. Widget 408A will gather activity data and pass this data, typically via the Internet, for back end processing 410A controlled by the partner entity (e.g., back end processing 410A may include a partner's activity storage server). Back end processing server 410A will then pass data to activity storage server 412. This can be done via, for example, the Internet (e.g., server-to-server API call) or via secure FTP (SFTP) batch transfer. The data can also be passed via a Web browser call.

Owner of widget 408A or 410A typically enters a business relationship or arrangement with an entity running a Web site to have the widget installed at a site. Once installed, the widget will collect activity data from the site. In short, widgets 406A and 408A will gather sharing activity data and pass this data to activity storage server 412, typically via the Internet. Information collected via partner widget 408A may be processed by a back end process server 410A and then forwarded to activity server 412.

A system can include either widget 406A or widget 408A types. These widgets collect activity information from third party sites. A user (sender) of a third party site uses the widget to share an article or other information available at the site. The sender clicks on the widget and sends a link to another user (recipient). The widget captures the link, but does not look at any personally identifier or private information such as the contents of an e-mail or message. When the recipient clicks on the link, a sharing connection is created between the recipient and the sender.

URL shortener. An activity collection resource can be a uniform resource locator (URL) shortening tool or application. URL shortening is a technique on the Web in which a URL may be made substantially shorter in length and still direct to the required page. This is achieved by using an HTTP redirect on a domain name that is short, which links to the web page that has a long URL. Some examples of URL shortening include sites by TinyURL, Bitly Enterprise, and re.Po.st Enterprise by RadiumOne.

The URL shortening site can be system owned 406B or partner owned 408B. Similar to widgets 406A and 408A, activity collected via a shortening site is sent to activity server 412. When partner owned, activity data from site 408B may be processed by back end 410B before sending to activity server 412.

To create a shortened URL, a user enters the full URL at the shortening site. The site presents the user with the shortened URL which the user can send or post. When the recipient of the shortened URL clicks on it, the recipient is redirected to the full site.

The shortened URL created is a unique link. Once the recipient clicks on the link, this can identify a sharing connection between the sender of the link and the recipient. This activity data is captured by the system.

Social media sharing application or site. Applications (e.g., a mobile app on a smartphone or tablet computer) or sites allow sharing of information with others. These can be used to collect activity data. They can be system owned applications 406C or partner owned 408C. Some examples of such sites include Facebook (e.g., Instagram), Pinterest, Tumblr, and via.me. With a social media sharing application or site, users can publish links and other information for others.

A user (sender) can share information (e.g., video, photo, link, article, or other) by posting to a site. The user can post directly on the site or use a application program, such as a mobile application on a smartphone or tablet computer. When another user (recipient) clicks or vies the link, there is connection activity between the sender and recipient. This activity data is captured by the system.

Messenger. Applications (e.g., a mobile app on a smartphone or tablet computer) or sites allow Internet or Web messaging with others. Internet messaging is different from short messaging server (SMS) or text messaging. Messenger applications can be used to collect sharing activity data. An example of a messenger application site is pingme.net, which is a cross-platform messaging application, and WhatsApp messenger. These applications can also do group messaging.

Users use messenger application to send links and other information to other users. A user (sender) can copy link (e.g., via a clipboard) and send to one or more users via the messenger application. When a recipient user clicks on the link, there is connection activity between the sender and recipient for that link.

Sharing activity data can be captured as described above. There can be different data collectors for different devices and platforms. For examples, there can be different applications for Android Web, Android application, and desktop Web.

The activity data is transmitted to and stored at activity storage server 412, typically through the Internet. Server 412 stores the data for further processing. There can be a significant amount of real-time data that is collected for processing. The file and processing system may employ infrastructure and databases such as Oracle, IBM, or Apache™ Hadoop™. Distributed computing and processing can be used to process the data.

In an implementation, the Apache Hadoop software library is a framework that allows for the distributed processing of large data sets across clusters of computers using a simple programming model. It is designed to scale up from single servers to thousands of machines, each offering local computation and storage. Rather than rely on hardware to deliver high-availability, the library itself is designed to detect and handle failures at the application layer, so delivering a highly-available service on top of a cluster of computers, each of which may be prone to failures. See hadoop.apache.org for more information.

The activity data collected by the widgets is stored at server 412, usually in a database or file systems (such as Hadoop Distributed File System (HDFS)) on hard drives of the server. There may be many terabytes of data that need are to be processed. Taking the stored activity data as input is a build-update graph component 421 (e.g., executable code running on one or more a servers or other computers). Build-update graph 421 can run on the same server that stores the activity data, or may run on a separate server that accesses the storage server 412.

Build-update graph 421 builds or updates a social graph using the collected activity data. The social graph can be stored in one or more databases or file systems (such as Hadoop file system). Build-update graph 421 includes three components: (1) an identify nodes and edges for social graph that need to be updated 423, (2) a create new nodes/edges if nodes/edges are not found 426, and (3) an update values associated with nodes and edges 428.

For the incoming activity data collected, identify nodes 423 scans through and finds the nodes and edges of the social graph that need to be updated. As discussed above, no personally identifiable information (PII) is collected in the activity data.

Some examples of personally identifiable information includes, for example, name, such as full name, maiden name, mother's maiden name, or alias; address information, such as street address or e-mail address; mobile telephone; and credit card information. Personally identifiable information is information that can be used to uniquely identify, contact, or locate a single person or can be used with other sources to uniquely identify a single individual.

In contrast to personally identifiable information, nonpersonal information is information that is recorded about users so that it no longer reflects or references an individually identifiable user. Some examples of nonpersonal information include cookies, Web beacons, demographic information (e.g., zip code, age, gender, and interests), server log files, environmental variables (e.g., operating system, OS version, Internet browser, and screen resolution), and others.

The incoming activity gathered by resources 405 and 407 have no personally identifiable information. Similarly, the nodes of the social graph have profiles with no personally identifiable information, being anonymous and simply identified.

Using nonpersonal information in the activity data, identify nodes 423 attempts to find a corresponding or matching node (e.g., anonymous user profiles) or edges, or both, in the nonpersonal information contained in the social graph. A matching algorithm can use a variety of factors to match nodes (or users).

User identification and device fingerprinting. In a specific implementation, the RadiumOne system identifies a user uniquely but anonymously by RadiumOne user ID. This can be a randomly generated but unique alphanumerical string that is assigned to a user or node when the system first time processes this user's activity or event (such as viewing a webpage, sharing a link, or other activity).

This user ID is then stored in the User Identification Attributes Storage of the RadiumOne Operating Storage of User Models. User Identification Attributes Storage also stores various device fingerprinting attributes associated with this user ID: various device IDs and their combinations and hashes, IP addresses, operating systems and browsers (e.g. type and version via a user agent field); typical user navigational, geo-temporal, and behavioral patterns, various personalized elements in the Web pages often visited by the user, various personalized elements of user device or browser configuration, such as browser window size, and others.

When a user uses a browser that supports cookies, a user ID is also stored in a RadiumOne browser cookie.

When the RadiumOne system is processing a user activity data (such as viewing a Web page, sharing a link, or other activity), it is trying to attribute this activity to one or several user IDs from the User Identification Attributes Storage as well as probabilities that this activity is performed by these user IDs (as described below). If no user ID from the User Identification Attributes Storage could be attributed to the activity with high enough probability (above certain threshold), a new user ID is generated by the system and:

(1) This user ID is assigned to this activity with probability 1.

(2) This user ID is stored in the User Identification Attributes Storage, together with the device fingerprinting attributes that were available in this user activity data.

(3) When a user uses a browser that supports cookies, a user ID is also stored in a RadiumOne browser cookie.

When the RadiumOne system is trying to attribute this activity to one or several user IDs from the User Identification Attributes Storage, as well as evaluate probabilities that this activity is performed by these user IDs, it first checks if a RadiumOne cookie with RadiumOne user ID is available in the received user activity data.

(1) If it is, the RadiumOne system extracts user ID from the cookie. This user ID is then attributed this user ID to this activity. The probability of the match is set to 1.

(2) If it is not, the RadiumOne system extracts all device fingerprinting attributes that are available in the received user activity data. The RadiumOne system then applies RadiumOne probabilistic fingerprinting algorithms to these attributes and calculates match probabilities—probabilities that this set of device fingerprinting attributes belongs to user IDs from the User Identification Attributes Storage. User IDs from the User Identification Attributes Storage with the highest match probabilities—the match probabilities above certain thresholds—and associated match probabilities are then attributed to this activity.

When a node or edge is found (430), update values 428 will update the node or an edge (e.g., associated with the node). When a node or edge is not found (431), then create new node or edge 426 is created a new node or edge in the graph. The result of build/update graph 421 is a social graph 434 with nodes modeling user profiles and edge modeling sharing activities among users.

Figure 5:
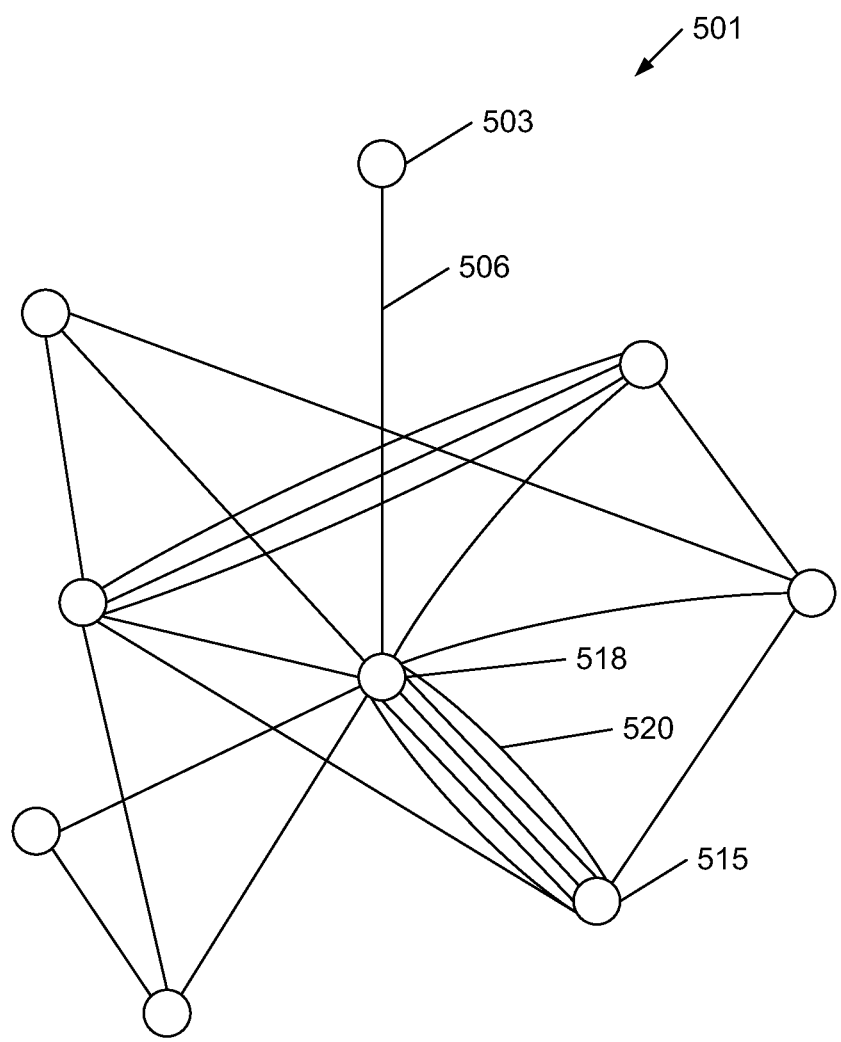
FIG. 5 shows a social graph with nodes representing users and edges representing sharing activity between the users.

FIG. 5 shows a sample social graph 501 where circles 503 represent nodes and lines are edges 506 representing sharing interactions between nodes. There can be one or more edges 506 between two nodes. Several edges between nodes typically indicate sharing activities along several categories: e.g., travel, computers, sports, and others.

Nodes connected together directly have one degree of separation. Nodes connected through one other node have two degrees of separation. Depending on a number of intervening nodes between two nodes, this will be a number of degrees of separation between the two nodes. For example, node 518 is one degree of separation away from node 503. Node 515 is two degrees of separation from node 503.

In a specific implementation, edges between nodes indicate sharing activities along several categories such as travel, computers, sports, and so forth. For each additional new sharing category, an additional edge is added. In a specific implementation, for each additional new sharing interest category, an additional edge is added. Further, in an implementation, the sharing interaction or edges between the nodes is weighted (e.g., weighting in a range from 0 to 1), so that certain types of sharing interactions are given different significance in the system. Weight can be used to represent a relative strength of interaction related to a particular interest category.

Some types of sharing activities that are tracked for the social graph (or share graph) include: sending messages between users; sending files between users; sending videos between users; sending an e-mail (e.g., Web e-mail) with a link from one user to another such as sharing a link to various social media sites like Facebook or Twitter; and sending instant messages between users. For mobile users on smart phones, the sharing activities can further include: sending SMS-type messages between users.

As discussed above, the system does not look at personal information, so the private information in the message or e-mail is not collected. But the words and links (e.g., link, short cut, or URL) from a Web site that the users copies such as by using a using a cut (or copy) operation and paste operation to send to another user can be part of the activity data collected by the collection resource 405 or 407. The copied link and information at the link is not personal information. From the information at the link, the system can determine the category of information that is being shared. The system can include automated text classification to classify articles and information at links.

Once two users connect, such as a user 515 (represented by a node 515 in FIG. 5) sends user 518 (represented by node 518) a message containing a link concerning travel (which was collected by resource 405 or 407). When recipient user 518 clicks on the link from sender user 515, the system will add an edge to the graph to represent the activity. An edge 520 is added to the graph to represent this sharing activity between the two users. Edge 520 is assigned a particular weight. A new "travel" edge will be added between these two users if it did not exist before. If it did, its weight will be increased.

In a specific implementation, two users are connected when one user (sender) shares information with another user or group and the other user (recipient) consumes the information that was sent (e.g., clicked-back on the shared link, opened an attachment, opened a message). For example, simply placing a link on Facebook wall so that all 250 Facebook "friends" can see this link or tweeting a link to 250 Twitter followers will not create a connection between the sender, or sharer, and 250 people in the graph. This would create significant noise in the system. The connections are created between the sender and only those users who clicked back on (or otherwise consumed) the message.

For example, more recently sent messages are given a greater weight than older messages. So edge 520 may be assigned a particular weight, while one or more other edges between nodes 515 and 518 are reduced by some amount. As time passes, the contribution of individual sharing activities to a particular edge will decrease. For example, the more recently sent messages are given a greater weight than older messages. In an implementation, the system graph tracks time, and updates the weights of edges (e.g., reduces their value) when updating other edges between two nodes. Further, there can a periodically purge (e.g., monthly) of stale nodes and edges. For example, nodes and edges that have been inactive more than a threshold amount of time or nodes and edges with weight (strength) falling below a certain threshold can be purged.

By tracking sharing activity between users instead of just solo users, this will allow better understanding of the characteristics of 518. For example, during user 518 surfing, user 518 has never before indicated an interest in travel. However, by recording the sharing interaction, because user 515 sent some travel related content to user 518 (and user 518 consumed this content), the system can attribute or imply an interest in travel to user 518, even though user 518 has never had any personal surfing to indicate this. Therefore, using the ShareGraph social graph, which tracks sharing activity, more and better information about the users can be gathered.

The system can handle users it does not have much information. For examples, user interest in a particular category depends on what was shared. For example, nodes connected to the person are interested in travel, but they did not share travel with this person yet. And this person has not navigated travel sites (no preexisting behavior). The system can infer the person has an interest in travel, but with lower confidence level.

Further depending on how user 518 interacted with the message from user 515, strength of edge 520 can be increased or decreased. For example, if user 518 clicked on the link and purchased something on the link. This indicated a very strong interest, and an edge 520 can be updated with an appropriate value. If user 518 discarded the message without clicking on the link then edge 510 will be update to indicate a low strength.

The strength of an edge is affected by: (1) user A (message recipient) reads the message; (2) user A reads and re-sends the message to user B; (3) user B does not read message from user A; and (4) user B reads the message from user A. Generally, action 4 is stronger than action 3, which is stronger than 2, which is stronger than 1.

The strength or weight of an edge also depends on how many users the message was sent to. In general, the smaller the group of the recipients, the more the strength will increase if the user (a message recipient) clicks back, but the more strength will decrease if the user (a message recipient) does not click back. For a group message to 24 people versus a direct message to one person, when there are 24 potential recipients, each click back will increase weight less than if the only one direct recipient clicks back.

Collection devices collect sharing activity. The social graph continues to be updated with the new activity data and the passage of time. The social graph is continuously updated by new nodes being added, new edges being added, nodes being updated, edges being updated, strengths and weightings being updated due to new activity, and the graph is updated due to the passage of time because more recent information is treated as being more important than past activity data. Generally, strength decreases as time passes (recency decreases) and increases when several sharing activities happened during a relatively short period of time (frequency).

A traditional social graph may have some vague relationship between users, where an edge of the graph does not tell how strong or real the connection is and what kind of interest or commercial intent the users are sharing. So ads delivered to these users may not be particular relevant.

In the ShareGraph social graph, there is some action between users. There is a real connection of influencer and influence. ShareGraph tracks kind of interest or intent the users are sharing. For example, when user A sends user B an article on Android phones or link to a coupon for www.elitetoystore.com, this means there is a shared interest or intent is Android or toys. This is much more valuable information, especially for ad targeting.

In a specific implementation, the strength algorithms have a hierarchy for interest categories or granularity. For example, an Android phone interest will increase the strengths of both an Android edge and a mobile phone edge. The Android edge strength increase will be greater than the mobile phone edge.

Also, weighting of an edge depends on how accurate and relevant a shared link or content categorization is. Sharing a review article on the latest Android OS (e.g., Android Ice Cream Sandwich) has higher confidence level of Android interest than sharing an article on latest consumer electronics show (CES) that mentions the latest Android.

In a specific implementation, the shared social graph for the open Web technology ports data from a variety of sources creates distinct connections between users, and then targets the necessary ads behind the scenes in real time. ShareGraph uses underlying behavior of "sharing" to establish distinct connections.

The system can match the same user which connects via several devices such as a mobile browser, mobile app, regular Web browser. The system providers or makes use of a variety of data collectors or resources existing on different devices and platforms.

In order to build ShareGraph around RadiumOne user ID, various browser and device IDs captured by RadiumOne for users of RadiumOne system owned as well as third party data collectors should be matched to RadiumOne user ID for the same user. This is done by using two approaches:

1. Using deterministic match by leveraging system owned and third party partner applications that have regular (nonmobile) Web, mobile Web, and mobile app presence and require user login. Two RadiumOne cookie IDs (e.g., a mobile one and a regular (nonmobile) Web one), as well as mobile device ID are matched via a common account ID when the same user logs in into the application via regular (nonmobile Web), via mobile Web, and via mobile application.

2. Using probabilistic match by leveraging various device connection algorithms. These are based on user geo-temporal and behavioral patterns. Such as matching regular (nonmobile) and mobile Web browser IDs as well as mobile device IDs based on a history of all of them appearing within the same geo-vicinity and the same time interval. A confidence level is associated with such matches.

In a specific implementation, the system builds user predictive models based on user various online activities, in particular sharing activities that are modeled through a ShareGraph.

The process includes two activities:

1. Building and maintaining user predictive models, including ShareGraph. The system builds user predictive models based on user various online activities, in particular sharing activities. The data is based on various data sources including both internal (own) and external (partner data).

2. Serving targeted ads to users based on user predictive models, including ShareGraph.

Figure 6:
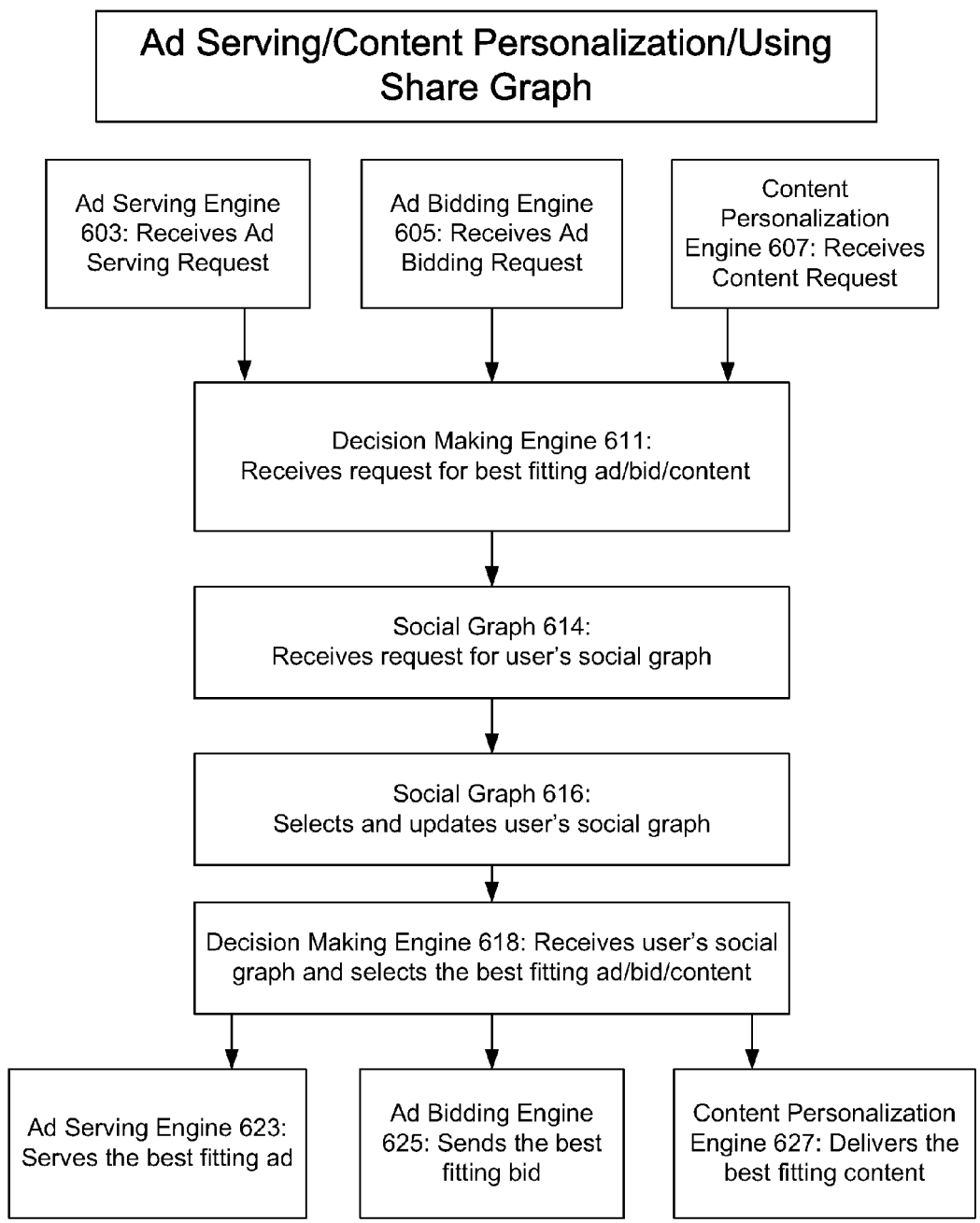
FIG. 6 shows a more detailed diagram of a system utilizing a social graph with sharing activity.

FIG. 6 shows a more detailed diagram of a system utilizing a social graph with sharing activity. The system includes an ad serving engine 603, ad bidding engine 605, and content personalization engine 607.

The ad serving engine receives ad serving requests. The ad bidding engine receives ad bidding requests. The content personalization engine receives content test.

The request engines 603, 605, and 607 are input to a decision making engine 611, which receives the request for a best fitting ad, bid, or content. The decision making engine requests a users' social graph 614, which is built as described above and in FIG. 4. The system selects and updates the user's social graph 616. Based on the social graph, decision making engine 618 receives the social graph and selects the best fitting ad, bid, or content. Engine 618 sends this ad to the ad serving engine 623, ad bidding engine 625, or content personalization engine 627 as appropriate.

The system can buy inventories from the system's own publisher network as well as on real-time bidding (RTB) exchanges. Any time the server receives an ad request from a publisher or bid request from an RTB exchange, the server has to decide on what ad to serve to this particular user. The time allowed to respond to a bid request may be, for example, 120 milliseconds. So, the decision and exchange occurs in a real time.

In an implementation, in a first step, the RadiumOne server obtains a RadiumOne user ID. For an ad request from a publisher network, the RadiumOne user ID is obtained from RadiumOne cookie. For a bid request from an RTB exchange, RTB exchange sends exchange user ID along with a bid request which is then converted into the RadiumOne user ID. The RadiumOne user IDs are matched to exchange user IDs through a cookie matching process.

Once the RadiumOne user ID is obtained, a user predictive model corresponding to this RadiumOne user ID is retrieved from RadiumOne Operating Storage of User Models and is used for choosing the most targeted ad, bid, or content for the given ad, bid, or content serving opportunity.

Figure 7:
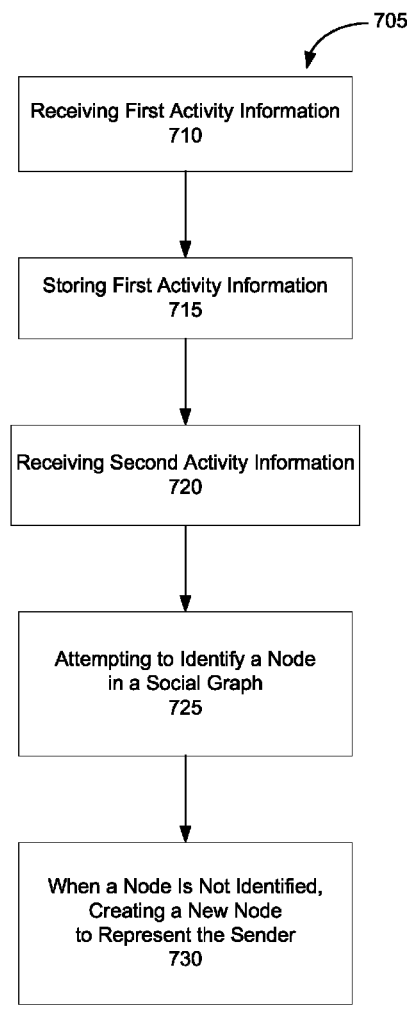
FIG. 7 shows a flow diagram of building a social graph from sharing activity between a sender and recipient of the open Web.

FIG. 7 shows a flow 705 for building a social graph from sharing activity between a sender and recipient of the open Web.

In a step 710, first activity information is received for a sender of a first link to at least one recipient. The activity information is collected by a collection resource at a Web site. None of the sender's personally identifiable information is collected when collecting the first activity information.

In a step 715, the first activity information is stored at a storage server.

In a step 720, second activity information is received when a recipient accesses the first link sent by the sender. This corresponds to the first activity information stored at the storage server. None of the recipient's personally identifiable information is collected when collecting the second activity information.

In a step 725, there is an attempt to identify a first node representative of the sender in a social graph.

In a step 730, when a first node representative of the sender in a social graph is not identified, a second node is created to represent the sender in the social graph.

Figure 8:
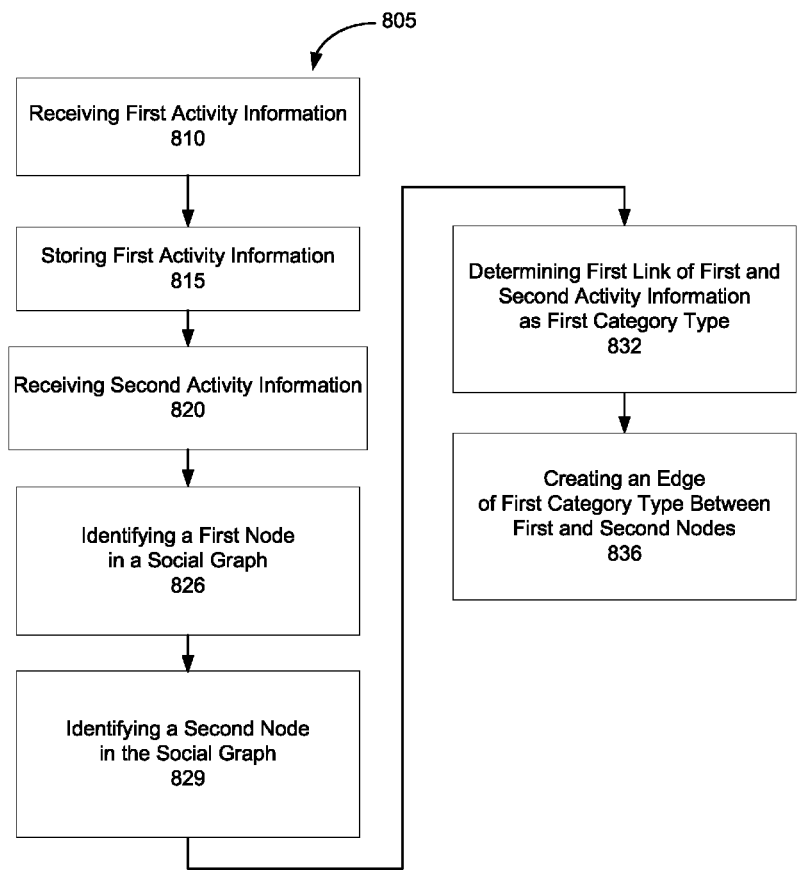
FIG. 8 shows a flow diagram of building a social graph from sharing activity of users of the open Web including creating an edge representing a category type

FIG. 8 shows a flow 805 of building a social graph from sharing activity of users of the open Web including creating an edge representing a category type.

In a step 810, first activity information is received for a sender of a first link to at least one recipient. The activity information is collected by a collection resource at a Web site. None of the sender's personally identifiable information is collected when collecting the first activity information.

In a step 815, the first activity information is stored at a storage server.

In a step 820, second activity information is received when a recipient accesses the first link sent by the sender. This corresponds to the first activity information stored at the storage server. None of the recipient's personally identifiable information is collected when collecting the second activity information.

In a step 826, using the first activity information, a first node in a social graph is identified as being representative of the sender.

In a step 829, using the second activity information, a second node in a social graph is identified as being representative of the recipient.

In a step 832, a first category type is determined as a category for the first link. The first link is associated with the first activity information (e.g., sender of first link to at least one recipient) and second activity information (e.g., recipient accesses the first link).

In a step 836, a first edge is created between first and second nodes in the social graph. The first edge is representative of the first category type.

Figure 9:
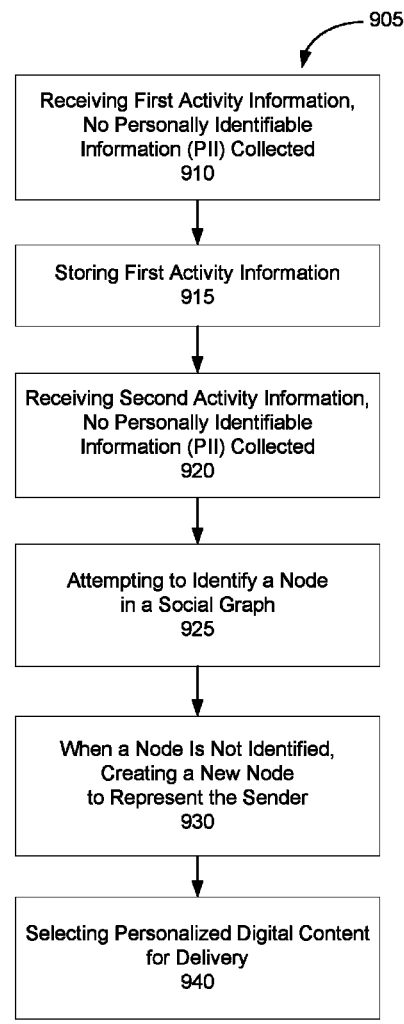
FIG. 9 shows a flow diagram for selecting personalized digital content for delivery based on sharing activity in a social graph.

FIG. 9 shows a flow 905 for building a social graph from sharing activity between a sender and recipient of the open Web, and based on this sharing activity, selecting personalized digital content for delivery to the sender or recipient, or both.

In a step 910, first activity information is received for a sender of a first link to at least one recipient. The activity information is collected by a collection resource at a Web site. None of the sender's personally identifiable information is collected when collecting the first activity information.

In a step 915, the first activity information is stored at a storage server.

In a step 920, second activity information is received when a recipient accesses the first link sent by the sender. This corresponds to the first activity information stored at the storage server. None of the recipient's personally identifiable information is collected when collecting the second activity information.

In a step 925, there is an attempt to identify a first node representative of the sender in a social graph.

In a step 930, when a first node representative of the sender in a social graph is not identified, a second node is created to represent the sender in the social graph.

In a step 940, based on at least information associated with the second node in the social graph, personalized digital content is selected for delivery.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
receiving first activity information for a sender of a first link to at least one recipient collected by a collection resource at a Web site, wherein no personally identifiable information of the sender is collected in collecting the first activity information, and the personally identifiable information of the sender comprises an e-mail address of the sender;
storing the first activity information at a storage server;
receiving second activity information when a recipient accesses the first link sent by the sender corresponding to the first activity information stored at the storage server, wherein no personally identifiable information of the recipient collected in collecting the second activity information;
using at least one processor, attempting to identify a first node representative of the sender in a social graph;
when a first node representative of the sender in a social graph is not identified and after receiving the second activity information, creating a second node to represent the sender in the social graph; and
based on at least information associated with the second node in the social graph, selecting a personalized digital content for delivery to the sender.

2. The method of claim 1 further comprising:
maintaining the social graph comprising:
using activity information stored at the storage server, determining a plurality of nodes representing persons specified in a plurality of activity information stored at the storage server;
generating a plurality of edges in the social graph, wherein each edge represents at least one activity information of the plurality of activity information; and
using the plurality of edges to couple the plurality of nodes.

3. The method of claim 2 wherein the determining the plurality of nodes representing persons specified in a plurality of activity information stored at the storage server comprises disallowing access to personally identifiable information of the persons.

4. The method of claim 1 wherein the social graph comprises a plurality of activity information, each activity information represented in the social graph by an edge coupling at two nodes of the social graph.

5. The method of claim 1 wherein the first activity information is generated by a mobile application.

6. The method of claim 1 wherein the first activity information is generated by activity at a Web site.

7. The method of claim 1 wherein the selecting a personalized digital content for delivery to the sender is in response to at least one of a bid request from a real-time bidding exchange or an ad request from a publisher network.

8. The method of claim 1 wherein at the plurality of activity data comprises at least one activity data collected from a sharing widget installed on a device of the sender.

9. The method of claim 1 wherein the plurality of activity data comprises activity data collected from an instant messaging application.

10. The method of claim 1 wherein selecting a personalized digital content for delivery to the sender comprises:
using a user predictive model appropriate for the second node in the social graph to select the personalized digital content, wherein the user predictive model considers sharing activity associated with the second node.

11. The method of claim 1 wherein the first activity information comprises at least one of sending a video, sending a file, cutting and pasting of content, or sending of an e-mail.

12. The method of claim 1 wherein the first activity information comprises sending an instant message from the sender to the recipient.

13. The method of claim 1 wherein each edge between nodes in the social graph represents a sharing category.

14. The method of claim 1 comprising:
sending a bid in response to a bid request from a real-time bidding exchange, wherein the bid comprises the selected personalized digital content.

15. The method of claim 1 comprising:
making a bid to an ad exchange for an advertisement, wherein the bid comprises the selected personalized digital content.

16. The method of claim 1 wherein the receiving first activity information for the sender of the first link comprises:
sending of an e-mail including the first link by the sender via a mobile device.

17. The method of claim 16 wherein the receiving second activity information when the recipient accesses the first link comprises:
receiving of the e-mail including the first link by the recipient via a mobile device.

18. The method of claim 16 wherein the receiving second activity information when the recipient accesses the first link comprises:
receiving of the e-mail including the first link by the recipient via a nonmobile device.

19. The method of claim 1 wherein the receiving first activity information for the sender comprises:
sending of an e-mail including the first link by the sender via a nonmobile device.

20. The method of claim 19 wherein the receiving second activity information when the recipient accesses the first link comprises:
receiving of the e-mail including the first link by the recipient via a mobile device.

21. The method of claim 19 wherein the receiving second activity information when the recipient accesses the first link comprises:
receiving of the e-mail including the first link by the recipient via a nonmobile device.

22. A method comprising:
receiving first activity information for a sender of a first link to at least one recipient collected by a collection resource at a Web site;
storing the first activity information at a storage server;
receiving second activity information when a recipient accesses the first link sent by the sender corresponding to the first activity information stored at the storage server, wherein a personally identifiable information of the recipient includes an e-mail address of the recipient, and no personally identifiable information of the recipient collected in collecting the second activity information;
using at least one processor, attempting to identify a first node representative of the sender in a social graph;
when a first node representative of the sender in a social graph is not identified and after receiving the second activity information, creating a second node to represent the sender in the social graph; and
based on at least information associated with the second node in the social graph, selecting a personalized digital content for delivery to at least one of the recipient or sender.

23. The method of claim 22 wherein the selecting a personalized digital content for delivery is in response to at least one of a bid request from a real-time bidding exchange or an ad request from a publisher network.

24. A method comprising:
receiving first activity information for a sender of a first link to at least one recipient collected by a collection resource at a Web site, wherein a personally identifiable information of the sender includes an e-mail address of the sender, and no personally identifiable information of the sender is collected in collecting the first activity information;
storing the first activity information at a storage server;
receiving second activity information when a recipient accesses the first link sent by the sender corresponding to the first activity information stored at the storage server;
using at least one processor, attempting to identify a first node representative of the sender in a social graph;
when a first node representative of the sender in a social graph is not identified and after receiving the second activity information, creating a second node to represent the sender in the social graph; and
based on at least information associated with the second node in the social graph, selecting a personalized digital content for delivery to at least one of the recipient or sender.

25. The method of claim 24 wherein the selecting a personalized digital content for delivery is in response to at least one of a bid request from a real-time bidding exchange or an ad request from a publisher network.

26. A method comprising:
receiving first activity information for a sender of a first link to at least one recipient collected by a collection resource at a Web site, wherein no personally identifiable information of the sender is collected in collecting the first activity information;
storing the first activity information at a storage server;
receiving second activity information when a recipient accesses the first link sent by the sender corresponding to the first activity information stored at the storage server, wherein no personally identifiable information of the recipient collected in collecting the second activity information, and the personally identifiable information of the recipient comprises an e-mail address of the recipient;
using at least one processor, attempting to identify a first node representative of the sender in a social graph;

when a first node representative of the sender in a social graph is not identified and after receiving the second activity information, creating a second node to represent the sender in the social graph; and based on at least information associated with the second node in the social graph, selecting a personalized digital content for delivery to the sender.

27. The method of claim 26 further comprising:
maintaining the social graph comprising:
using activity information stored at the storage server, determining a plurality of nodes representing persons specified in a plurality of activity information stored at the storage server;
generating a plurality of edges in the social graph, wherein each edge represents at least one activity information of the plurality of activity information; and
using the plurality of edges to couple the plurality of nodes.

28. The method of claim 27 wherein the determining the plurality of nodes representing persons specified in a plurality of activity information stored at the storage server comprises disallowing access to personally identifiable information of the persons.

29. The method of claim 26 wherein the social graph comprises a plurality of activity information, each activity information represented in the social graph by an edge coupling at two nodes of the social graph.

30. The method of claim 26 wherein the first activity information is generated by a mobile application.

31. The method of claim 26 wherein the first activity information is generated by activity at a Web site.

32. The method of claim 26 wherein the selecting a personalized digital content for delivery to the sender is in response to at least one of a bid request from a real-time bidding exchange or an ad request from a publisher network.

33. The method of claim 26 wherein at the plurality of activity data comprises at least one activity data collected from a sharing widget installed on a device of the sender.

34. The method of claim 26 wherein the plurality of activity data comprises activity data collected from an instant messaging application.

35. The method of claim 26 wherein selecting a personalized digital content for delivery to the sender comprises:
using a user predictive model appropriate for the second node in the social graph to select the personalized digital content, wherein the user predictive model considers sharing activity associated with the second node.

36. The method of claim 26 wherein the first activity information comprises at least one of sending a video, sending a file, cutting and pasting of content, or sending of an e-mail.

37. The method of claim 26 wherein the first activity information comprises sending an instant message from the sender to the recipient.

38. The method of claim 26 wherein each edge between nodes in the social graph represents a sharing category.

39. The method of claim 26 comprising:
sending a bid in response to a bid request from a real-time bidding exchange, wherein the bid comprises the selected personalized digital content.

40. The method of claim 26 comprising:
making a bid to an ad exchange for an advertisement, wherein the bid comprises the selected personalized digital content.

41. The method of claim 26 wherein the receiving first activity information for the sender of the first link comprises:

sending of an e-mail including the first link by the sender via a mobile device.

42. The method of claim 41 wherein the receiving second activity information when the recipient accesses the first link comprises:
receiving of the e-mail including the first link by the recipient via a mobile device.

43. The method of claim 41 wherein the receiving second activity information when the recipient accesses the first link comprises:
receiving of the e-mail including the first link by the recipient via a nonmobile device.

44. The method of claim 26 wherein the receiving first activity information for the sender comprises:
sending of an e-mail including the first link by the sender via a nonmobile device.

45. The method of claim 44 wherein the receiving second activity information when the recipient accesses the first link comprises:
receiving of the e-mail including the first link by the recipient via a mobile device.

46. The method of claim 44 wherein the receiving second activity information when the recipient accesses the first link comprises:
receiving of the e-mail including the first link by the recipient via a nonmobile device.

47. A method comprising:
receiving first activity information for a sender of a first link to at least one recipient collected by a collection resource at a Web site, wherein no personally identifiable information of the sender is collected in collecting the first activity information, and the no personally identifiable information of the sender is collected comprises not collecting an e-mail address of the sender;
storing the first activity information at a storage server;
receiving second activity information when a recipient accesses the first link sent by the sender corresponding to the first activity information stored at the storage server, wherein no personally identifiable information of the recipient collected in collecting the second activity information;
using at least one processor, attempting to identify a first node representative of the sender in a social graph;
when a first node representative of the sender in a social graph is not identified and after receiving the second activity information, creating a second node to represent the sender in the social graph; and
based on at least information associated with the second node in the social graph, selecting a personalized digital content for delivery to the sender.

48. The method of claim 47 further comprising:
maintaining the social graph comprising:
using activity information stored at the storage server, determining a plurality of nodes representing persons specified in a plurality of activity information stored at the storage server;
generating a plurality of edges in the social graph, wherein each edge represents at least one activity information of the plurality of activity information; and
using the plurality of edges to couple the plurality of nodes.

49. The method of claim 48 wherein the determining the plurality of nodes representing persons specified in a plurality of activity information stored at the storage server comprises disallowing access to personally identifiable information of the persons.

50. The method of claim 47 wherein the social graph comprises a plurality of activity information, each activity information represented in the social graph by an edge coupling at two nodes of the social graph.

51. The method of claim 47 wherein the first activity information is generated by a mobile application.

52. The method of claim 47 wherein the first activity information is generated by activity at a Web site.

53. The method of claim 47 wherein the selecting a personalized digital content for delivery to the sender is in response to at least one of a bid request from a real-time bidding exchange or an ad request from a publisher network.

54. The method of claim 47 wherein at the plurality of activity data comprises at least one activity data collected from a sharing widget installed on a device of the sender.

55. The method of claim 47 wherein the plurality of activity data comprises activity data collected from an instant messaging application.

56. The method of claim 47 wherein selecting a personalized digital content for delivery to the sender comprises:
using a user predictive model appropriate for the second node in the social graph to select the personalized digital content, wherein the user predictive model considers sharing activity associated with the second node.

57. The method of claim 47 wherein the first activity information comprises at least one of sending a video, sending a file, cutting and pasting of content, or sending of an e-mail.

58. The method of claim 47 wherein the first activity information comprises sending an instant message from the sender to the recipient.

59. The method of claim 47 wherein each edge between nodes in the social graph represents a sharing category.

60. The method of claim 47 comprising:
sending a bid in response to a bid request from a real-time bidding exchange, wherein the bid comprises the selected personalized digital content.

61. The method of claim 47 comprising:
making a bid to an ad exchange for an advertisement, wherein the bid comprises the selected personalized digital content.

62. The method of claim 47 wherein the receiving first activity information for the sender of the first link comprises:
sending of an e-mail including the first link by the sender via a mobile device.

63. The method of claim 62 wherein the receiving second activity information when the recipient accesses the first link comprises:
receiving of the e-mail including the first link by the recipient via a mobile device.

64. The method of claim 62 wherein the receiving second activity information when the recipient accesses the first link comprises:
receiving of the e-mail including the first link by the recipient via a nonmobile device.

65. The method of claim 47 wherein the receiving first activity information for the sender comprises:
sending of an e-mail including the first link by the sender via a nonmobile device.

66. The method of claim 65 wherein the receiving second activity information when the recipient accesses the first link comprises:
receiving of the e-mail including the first link by the recipient via a mobile device.

67. The method of claim 65 wherein the receiving second activity information when the recipient accesses the first link comprises:
receiving of the e-mail including the first link by the recipient via a nonmobile device.

68. A method comprising:
receiving first activity information for a sender of a first link to at least one recipient collected by a collection resource at a Web site, wherein no personally identifiable information of the sender is collected in collecting the first activity information;
storing the first activity information at a storage server;
receiving second activity information when a recipient accesses the first link sent by the sender corresponding to the first activity information stored at the storage server, wherein no personally identifiable information of the recipient collected in collecting the second activity information, and the no personally identifiable information of the recipient is collected comprises not collecting an e-mail address of the recipient;
using at least one processor, attempting to identify a first node representative of the sender in a social graph;
when a first node representative of the sender in a social graph is not identified and after receiving the second activity information, creating a second node to represent the sender in the social graph; and
based on at least information associated with the second node in the social graph, selecting a personalized digital content for delivery to the sender.

69. The method of claim 68 further comprising:
maintaining the social graph comprising:
using activity information stored at the storage server, determining a plurality of nodes representing persons specified in a plurality of activity information stored at the storage server;
generating a plurality of edges in the social graph, wherein each edge represents at least one activity information of the plurality of activity information; and
using the plurality of edges to couple the plurality of nodes.

70. The method of claim 69 wherein the determining the plurality of nodes representing persons specified in a plurality of activity information stored at the storage server comprises disallowing access to personally identifiable information of the persons.

71. The method of claim 68 wherein the social graph comprises a plurality of activity information, each activity information represented in the social graph by an edge coupling at two nodes of the social graph.

72. The method of claim 68 wherein the first activity information is generated by a mobile application.

73. The method of claim 68 wherein the first activity information is generated by activity at a Web site.

74. The method of claim 68 wherein the selecting a personalized digital content for delivery to the sender is in response to at least one of a bid request from a real-time bidding exchange or an ad request from a publisher network.

75. The method of claim 68 wherein at the plurality of activity data comprises at least one activity data collected from a sharing widget installed on a device of the sender.

76. The method of claim 68 wherein the plurality of activity data comprises activity data collected from an instant messaging application.

77. The method of claim 68 wherein selecting a personalized digital content for delivery to the sender comprises:
using a user predictive model appropriate for the second node in the social graph to select the personalized digital content, wherein the user predictive model considers sharing activity associated with the second node.

78. The method of claim 68 wherein the first activity information comprises at least one of sending a video, sending a file, cutting and pasting of content, or sending of an e-mail.

79. The method of claim 68 wherein the first activity information comprises sending an instant message from the sender to the recipient.

80. The method of claim 68 wherein each edge between nodes in the social graph represents a sharing category.

81. The method of claim 68 comprising:
sending a bid in response to a bid request from a real-time bidding exchange, wherein the bid comprises the selected personalized digital content.

82. The method of claim 68 comprising:
making a bid to an ad exchange for an advertisement, wherein the bid comprises the selected personalized digital content.

83. The method of claim 68 wherein the receiving first activity information for the sender of the first link comprises:
sending of an e-mail including the first link by the sender via a mobile device.

84. The method of claim 83 wherein the receiving second activity information when the recipient accesses the first link comprises:
receiving of the e-mail including the first link by the recipient via a mobile device.

85. The method of claim 83 wherein the receiving second activity information when the recipient accesses the first link comprises:
receiving of the e-mail including the first link by the recipient via a nonmobile device.

86. The method of claim 68 wherein the receiving first activity information for the sender comprises:
sending of an e-mail including the first link by the sender via a nonmobile device.

87. The method of claim 86 wherein the receiving second activity information when the recipient accesses the first link comprises:
receiving of the e-mail including the first link by the recipient via a mobile device.

88. The method of claim 86 wherein the receiving second activity information when the recipient accesses the first link comprises:
receiving of the e-mail including the first link by the recipient via a nonmobile device.

89. A method comprising:
receiving first activity information for a sender of a first link to at least one recipient collected by a collection resource at a Web site, wherein no personally identifiable information of the sender is collected in collecting the first activity information, and the personally identifiable information comprises e-mail addresses;
storing the first activity information at a storage server;
receiving second activity information when a recipient accesses the first link sent by the sender corresponding to the first activity information stored at the storage server, wherein no personally identifiable information of the recipient collected in collecting the second activity information;
using at least one processor, attempting to identify a first node representative of the sender in a social graph;
when a first node representative of the sender in a social graph is not identified and after receiving the second activity information, creating a second node to represent the sender in the social graph; and
based on at least information associated with the second node in the social graph, selecting a personalized digital content for delivery to the sender.

90. The method of claim 89 further comprising:
maintaining the social graph comprising:
using activity information stored at the storage server, determining a plurality of nodes representing persons specified in a plurality of activity information stored at the storage server;
generating a plurality of edges in the social graph, wherein each edge represents at least one activity information of the plurality of activity information; and
using the plurality of edges to couple the plurality of nodes.

91. The method of claim 90 wherein the determining the plurality of nodes representing persons specified in a plurality of activity information stored at the storage server comprises disallowing access to personally identifiable information of the persons.

92. The method of claim 89 wherein the social graph comprises a plurality of activity information, each activity information represented in the social graph by an edge coupling at two nodes of the social graph.

93. The method of claim 89 wherein the first activity information is generated by a mobile application.

94. The method of claim 89 wherein the first activity information is generated by activity at a Web site.

95. The method of claim 89 wherein the selecting a personalized digital content for delivery to the sender is in response to at least one of a bid request from a real-time bidding exchange or an ad request from a publisher network.

96. The method of claim 89 wherein at the plurality of activity data comprises at least one activity data collected from a sharing widget installed on a device of the sender.

97. The method of claim 89 wherein the plurality of activity data comprises activity data collected from an instant messaging application.

98. The method of claim 89 wherein selecting a personalized digital content for delivery to the sender comprises:
using a user predictive model appropriate for the second node in the social graph to select the personalized digital content, wherein the user predictive model considers sharing activity associated with the second node.

99. The method of claim 89 wherein the first activity information comprises at least one of sending a video, sending a file, cutting and pasting of content, or sending of an e-mail.

100. The method of claim 89 wherein the first activity information comprises sending an instant message from the sender to the recipient.

101. The method of claim 89 wherein each edge between nodes in the social graph represents a sharing category.

102. The method of claim 89 comprising:
sending a bid in response to a bid request from a real-time bidding exchange, wherein the bid comprises the selected personalized digital content.

103. The method of claim 89 comprising:
making a bid to an ad exchange for an advertisement, wherein the bid comprises the selected personalized digital content.

104. The method of claim 89 wherein the receiving first activity information for the sender of the first link comprises:
sending of an e-mail including the first link by the sender via a mobile device.

105. The method of claim 104 wherein the receiving second activity information when the recipient accesses the first link comprises:
    receiving of the e-mail including the first link by the recipient via a mobile device.

106. The method of claim 104 wherein the receiving second activity information when the recipient accesses the first link comprises:
    receiving of the e-mail including the first link by the recipient via a nonmobile device.

107. The method of claim 89 wherein the receiving first activity information for the sender comprises:
    sending of an e-mail including the first link by the sender via a nonmobile device.

108. The method of claim 107 wherein the receiving second activity information when the recipient accesses the first link comprises:
    receiving of the e-mail including the first link by the recipient via a mobile device.

109. The method of claim 107 wherein the receiving second activity information when the recipient accesses the first link comprises:
    receiving of the e-mail including the first link by the recipient via a nonmobile device.

\* \* \* \* \*